April 19, 1966   J. P. CHOISSER ETAL   3,247,486
CODED SIGNAL CONTROL SYSTEM
Filed April 12, 1962
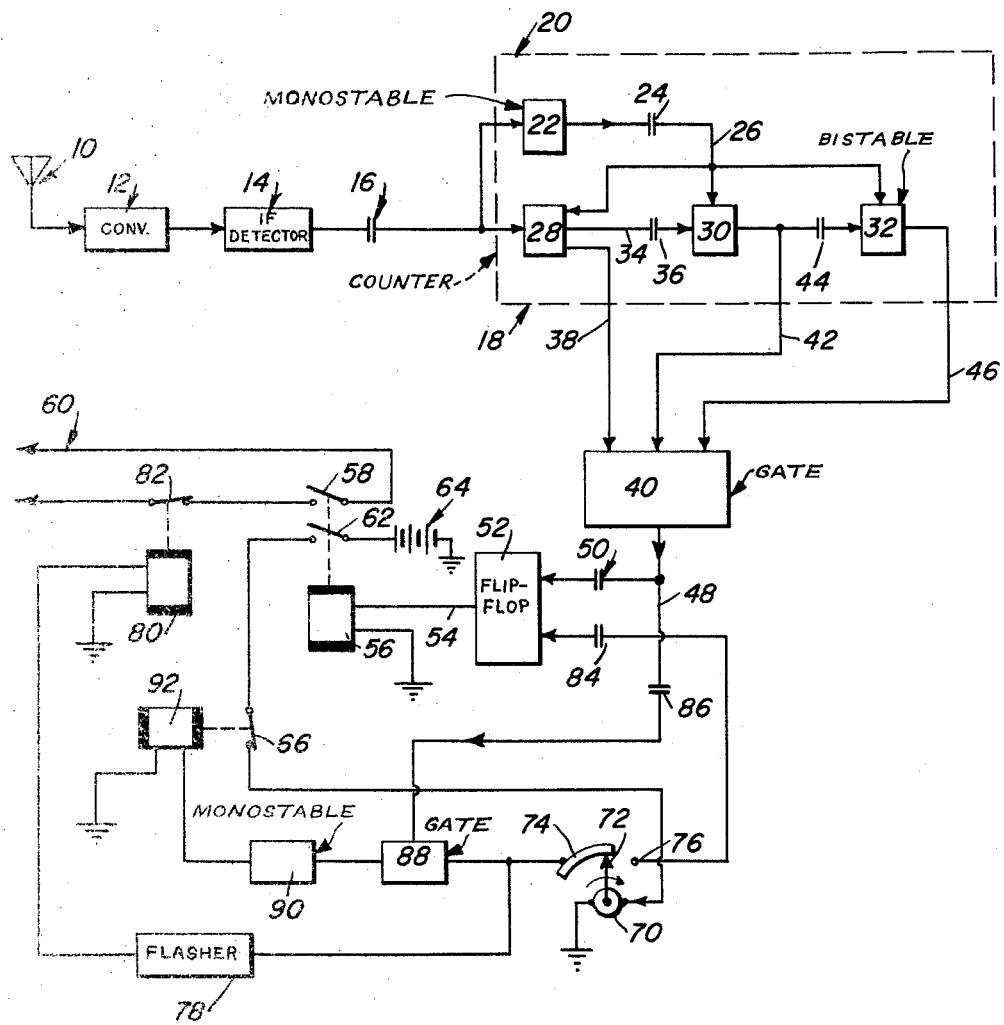
John P. Choisser
Jack Saelid
INVENTORS 3,247,486
CODED SIGNAL CONTROL SYSTEM
John P. Choisser, Chandler, Ariz., and Jack Saelid, Arcadia, Calif., assignors to Sentron, Inc., Research & Development, Tucson, Ariz., a corporation of Arizona
Filed Apr. 12, 1962, Ser. No. 187,045
3 Claims. (Cl. 340—164)

This invention relates to a remote control system and in particular to a radio signal operated control system particularly useful for the control of airport runway lights by approaching aircraft.

The control system of the present invention while particularly useful for control of airport runway lights, may be applicable to other installations. It is therefore a general object of the present invention to provide a remotely controlled control system that is activated by receipt of properly coded input radio signals.

Another object of this invention is to provide a remotely controlled control system which is automatically deactivated after a predetermined period of time following the remote control input signal.

A further object of this invention is to provide a control system that is operative to provide a warning when its cycle of operation approaches an end. The system therefore also provides facilities for prolonging the cycle of operation upon receipt of a second signal during the warning period.

Other objects of the present invention are to provide a control circuit which responds to reception of a modulated or an unmodulated radio signal which will not be triggered by other radio signals, which control circuit is extremely reliable and economical in cost by use of an all electronic computer type arrangement.

In accordance with the foregoing invention, the control system of the present invention operates by counting radio signal input pulses that may be received from any remotely operated transmitter as for example one located within an approaching aircraft. The control system is triggered into operation upon receipt of a predetermined number of input signal pulses spaced apart by no more than a predetermined amount so as to prevent accidental triggering. Other radio signals that may be received by the receiver portion of the system are therefore rejected by the system before the activating circuit is triggered. When the system is rendered operative by the input radio signal, the externally controlled device operatively connected to the control system is rendered operative for a predetermined period of time which in the present case, may be the airport runway lights. It will be appreciated, however, that under certain circumstances, the period of the cycle may be insufficient. Accordingly, a warning signal is issued through the externally controlled device by the control system when the cycle is approaching completion. The remote control transmitter may then be operated once again to transmit the coded radio signals which will be received by the control system which is then conditioned to prolong the operating cycle.

Referring now to the drawing, it will be observed that the components of the control system are diagrammatically illustrated to form an electronic circuit constituting the control system of the present invention. The radio frequency signal is therefore received by an antenna device 10 tuned to receive a preset radio frequency carrier signal from the remote control transmitter. The antenna device 10 is accordingly connected to a converter that feeds a signal to an intermediate frequency detector 14 coupled by the capacitor 16 to a counter device 18 and an automatic delay reset device 20. The counter 18 is therefore operative in connection with the gate device 40 to provide a triggering output signal in line 48 in response to a count of a predetermined number of input signal pulses. The input signal pulses must however be properly spaced in accordance with the coding heretofore mentioned, so as to prevent triggering by radio communication signals. The reset device 20 is therefore provided for such purpose which will be operative to reset the counter 18 so as to prevent premature triggering. The gate device 40 together with the flip-flop multi-vibrator device 52, the gate device 88 and any suitable device such as a mono-stable multi-vibrator 90 are operative as a logic component of the control system to operate the relay coil devices 56, 80 and 92 to establish a completed utilization control circuit 60 for a predetermined operational period by operation of the timer motor 70 with the control circuits 60 being intermittently interrupted as a warning signal during the operational period when the timing cycle approaches completion so as to provide a warning to the remote control operator. During this warning period, the logic component of the system will also condition the system so that upon reception of another coded signal, the operational period may be prolonged.

The counter 18 may be of any suitable type which will, after the proper reception of a predetermined number of input signal pulses, simultaneously pulse the gate device 40 whereupon an output voltage is produced in line 48 for starting the operating cycle of the system. The counter 18 may therefore comprise a plurality of bi-stable input triggered multi-vibrators such as multi-vibrators 28, 30 and 32. The multi-vibrators are electronic devices that have two stable conditions during which an input signal pulse will produce output signals that are of inverse value with respect to each other. Each successive pulse, however, shifts the multi-vibrator from one stable condition to the other to cause a reversal of the inverse outputs. The devices 28, 30 and 32 may also receive trigger pulses which are effective to reset the devices to one of the stable conditions thereof. Accordingly, the reset device 20 may include a mono-stable multi-vibrator device 22 that has one stable condition and a temporary condition which is stable for a predetermined period of time. Upon receipt of an input signal, the device 22 in the present case is arranged to be shifted to its temporary stable condition in which an output voltage of zero value is produced for the predetermined delay after which the device returns to its stable condition with an abrupt rise in the output voltage. The presence of an output voltage from the multi-vibrator device 22 will therefore be effective to reset the counting devices 28, 30 and 32. The counting devices may therefore trigger a signal counting gate 40 after the count of a predetermined number of input pulses. The gate 40 is therefore connected by the output line 48 to the flip-flop multi-vibrator 52 through the capacitor 50. The multi-vibrator 52 is of the type that has two stable conditions. An input pulse therefore produces an output pulse of one value in one condition and an output pulse of an inverse value when shifted to its other stable condition. The multi-vibrator device 52 may be shifted from one of its stable conditions to the other of its stable condition by a triggering pulse when a voltage is applied to the contact terminal 76 which is coupled to the device 52 through the capacitor 84. In one of its stable conditions, the multi-vibrator device 52 will in response to an input signal from the line 48, energize the relay coil 56 through the line 54 to close the normally open relay switches 58 and 62. Closing of the relay switch 58 completes the external control circuit 60 which is also provided with a normally closed relay switch 82 operated by the relay coil 80. Closing of the relay switch 62 simultaneously with the switch 58, also establishes a circuit from the grounded source of voltage 64 through the normally closed relay reset switch 66 to the timer motor 70 in order to begin a timing cycle. The timer 70 therefore has connected thereto a timer switch 72 which will apply the voltage from the grounded source 64 to the contact 74 during the warning periods hereinbefore mentioned. When the timer switch arm 72 completes its timing cycle it contacts the terminal 76 to pulse the flip-flop multi-vibrator 52 through the capacitor 84 which causes the device 52 to shift to its other stable condition deenergizing the relay coil 56, opening the control circuit 60 and also the circuit to the timing motor 70 causing it to be reset to its start position. The timing motor 70 therefore is associated with a clutch and return spring mechanism so that when the timer motor 70 is deenergized, the switch arm 72 will be returned to its start position. It will also be observed, that during the warning period, voltage applied through the timer switch 72 will energize the flasher device 78 which will be effective by virtue of its electrical connection to the relay coil 80 to intermittently energize the relay coil 80 and intermittently interrupt the control circuit 60 through the switch 82. Also, the voltage applied to the timer contact strip 74 will be applied to a reset controlling gate device 88 but will not be effective to produce any output therefrom until and unless a triggering signal is present in the output 48 coupled by the capacitor 86 to the gate 88. Should a second signal be present when the gate 88 is pulsed by the voltage applied to the terminal 74, it will produce an output pulse that is fed to a timer disabling device in the form of a mono-stable multi-vibrator 90 from which an output disabling voltage of a longer duration than the output pulse from gate 88 energizes the relay coil 92 for the purpose of opening the switch 66 to thereby temporarily interrupt the circuit to the timing motor 70 causing it to be reset.

To summarize operation of the system of the present invention, it will be recalled that the antenna device 10 receives a radio frequency carrier signal from the remote controlled transmitter which signal passes through the converter 12 and is detected by the detector 14 which accordingly issues a D.C. step voltage that is differentiated by the capacitor 16 into positive pulses providing input pulse signal voltages to the counter 18 and the automatic delay reset 20. The input pulses received by the mono-stable multi-vibrator 22 of the reset device 20 are arranged to shift the multi-vibrator 22 to its unstable condition with a zero output voltage for a predetermined period of time after which the stable condition returns and an abrupt rise in output voltage occurs. The output voltage from the multi-vibrator 22 is differentiated by the capacitor 24 to provide a trigger signal pulse to the reset line 26 for resetting the count of the counter 18. If a following input signal to the multi-vibrator 22 is impressed before it has returned to its stable condition, the output voltage thereof will remain zero. It will therefore be apparent, that a reset triggering output signal will be produced from the multi-vibrator 22 if the input signals thereto are improperly spaced apart. At the same time, the input pulse signal is received by the multi-vibrator 28 which issues inverse output signals to the output lines 34 and 38. The output in line 34 is differentiated by the capacitor 36 for supply of an input signal to the multi-vibrator 30 from which a phase shifted output signal is transmitted through line 42 to the gate 40. Also, the output signal from the multi-vibrator 30 is differentiated by the capacitor 44 to pulse the multi-vibrator 32 from which an output signal in line 46 is also supplied to the gate 40. It will therefore be appreciated, that successive input pulses to the multi-vibrator 28 will be effective through the output lines 38, 42 and 46 to provide a simultaneously applied output voltage through the gate 40 after a predetermined number of input pulses have been counted. The gate 40 will therefore respond to the predetermined input pulse count to provide an output pulse in the line 48. The output pulse in the line 48 is differentiated by the capacitor to provide an input signal pulse to the flip-flop multi-vibrator 52 producing an output pulse in the line 54 for energization of the relay coil 56 whereupon the switches 58 and 62 are closed. Closing of the switch 58 completes the external control circuit 60. At the same time, a timing control circuit is established by the closing of the switch 62 which extends from the grounded voltage source 64 through the closed timer resetting switch 66 and to the timer motor 70. The timer motor 70 then begins its timing cycle during which time the control circuit 60 remains closed. However, when the timer motor approaches the completion of the cycle, the warning period is established as the timer switch arm 72 transverses the contact strip 74 after which the timer contact arm 72 momentarily contacts the contact terminal 76 at the end of the timing cycle before it is returned or reset to its start position. During the warning period, the voltage from the source 64 is applied to the terminal contact 74 which is connected to the flasher device 78 so that the flasher will be operative to intermittently energize the relay coil 80 which will through the switch 82 intermittently interrupt the control circuit 60 to provide a flashing signal for the remote control operator. It will also be observed that the voltage from the voltage source 64 is applied to one of the inputs of the gate device 88. However, the gate device 88 will not be operative to issue an output signal until and unless a triggering pulse is received at its other input. The timer switch 72 will then proceed to the contact terminal 76 at which point a triggering voltage will be applied through the differentiating capacitor 84 to the flip-flop device 52 to shift it to its other stable condition whereupon the relay coil 56 is deenergized to complete the cycle of operation by opening the switches 58 and 62. The external control circuit 60 is then opened and the circuit to the timer opened so that the timer is immediately returned or reset to its start position by its associated clutch and return spring mechanism. However, during the warning period, should the remote control operator desire to prolong the operational period, a second coded signal may be transmitted for reception by the system as hereinbefore indicated whereupon the gate 40 produces an output in the output line 48 once again which will not affect the flip-flop device 52 since it is already in the stable condition to which it had been shifted by the input signal from the capacitor 50. However, the pulse in the line 48 will be transmitted through the differentiating capacitor 86 as a reset signal input to the gate 88 so that input voltages will be simultaneously applied to both inputs producing an output voltage that pulses the multi-vibrator 90. An output pulse of a duration sufficient to reset the timer is therefore issued from the multi-vibrator 90 which energizes the relay coil 92 opening the relay switch 66 to thereby interrupt the circuit to the timing motor 70. Accordingly, the timing motor is immediately returned to its start position by the clutch and return spring mechanism in order to begin the timed cycle anew. The operational period is thereby prolonged.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A control system for a remotely-controlled device comprising, means for receiving a coded signal, operating means connected to said receiving means and responsive to receipt of said coded signal for rendering said remotely controlled device operative for a predetermined operational period, means connected to the operating means for establishing a warning signal during said predetermined operational period and means coupled to the warning signal establishing means and responsive to reception of a second coded signal by the signal receiving means while the warning signal is established for prolonging the operational period of the operating means, said operating means including means connected to the warning signal establishing means for preventing establishment of the warning signal except during the warning period.

2. In a control system having a utilization circuit adapted to be controlled by dispatch of coded signals, signal triggered means responsive to receipt of a coded signal for completing said utilization circuit to begin an operational period, a timer having a predetermined timing cycle, timer energizing means responsive to said completion of the utilization circuit for initiating operation of the timer to begin said timing cycle, cycle terminating means responsive to completion of the timing cycle by the timer for opening the utilization circuit to terminate the operational period, warning signal means connected to the timer for establishing a warning period during the timing cycle, timer resetting means connected to said timer and rendered operative during said warning period for preventing completion of the timing cycle by the timer, and reset signal means responsive to receipt of a coded signal only during said warning period for rendering the timer resetting means operative to prolong the operational period beyond the timing cycle, said timer including a motor connected to said timer energizing means, a contact arm driven by the motor and conductive means connected to said timer resetting means and engageable by the contact arm in spaced relation to the cycle terminating means for defining the warning period.

3. In a control system having a utilization device adapted to be actuated for an operational period by dispatch of coded signals, a signal receiver having means for converting received signals into spaced signal pulses, a counter having a plurality of outputs simultaneously developing operating signals upon receipt of a predetermined number of signal pulses from the signal receiver, a reset device connected to the signal receiver and the counter for resetting the counter upon receipt of signal pulses spaced apart excessively to prevent said simultaneous development of operating signals, a first gate connected to the outputs of the counter for developing a trigger pulse in response to said simultaneous development of the operating signals in the outputs, a bi-stable device coupled to said first gate for producing an output voltage when switched to an active state by said trigger pulse, a timer rendered operative during a timing cycle when energized, means coupling the timer to the bi-stable device for switching thereof to an inactive state at the end of said timing cycle, a timing circuit connected to the timer for energization thereof, means responsive to said output voltage from the bi-stable device for simultaneously actuating the utilization device and completing the timing circuit, warning signal means connected to the timing circuit by the timer for concurrent energization therewith during a warning period in the timing cycle, a second reset signal gate coupled to said warning signal means and the first gate for producing a resetting pulse upon receipt of a trigger pulse when the signal warning means is energized, a mono-stable device coupled to the reset signal gate for temporarily producing a disabling voltage upon receipt of said resetting pulse and means responsive to said disabling voltage for interrupting the timing circuit in order to cause resetting thereof before the end of the timing cycle, whereby the operational period of the utilization device is prolonged beyond the timing cycle by coded signals dispatched during the warning period, said timer including a motor connected to the timing circuit, a contact arm driven by the motor, a cycle terminating contact connected by said coupling means to the bi-stable device, and a conductive element connected to said second reset signal gate and engaged by the contact arm during the warning period to condition the second gate for operation.

References Cited by the Examiner

UNITED STATES PATENTS

| | | | |
|---|---|---|---|
| 1,709,377 | 4/1929 | Sperry | 325—37 |
| 1,815,045 | 7/1931 | Boddie et al. | 343—228 |
| 2,325,258 | 7/1943 | Mallory | 340—26 |
| 2,407,949 | 9/1946 | Corcanges | 340—26 |
| 3,117,299 | 1/1964 | Lemm et al. | 340—26 |

NEIL C. READ, *Primary Examiner.*

THOMAS B. HABECKER, *Examiner.*